United States Patent
Dastidar

(10) Patent No.: US 12,147,369 B2
(45) Date of Patent: *Nov. 19, 2024

(54) SPATIAL DISTRIBUTION IN A 3D DATA PROCESSING UNIT

(71) Applicant: XILINX, INC., San Jose, CA (US)

(72) Inventor: Jaideep Dastidar, Austin, TX (US)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,859

(22) Filed: Jul. 21, 2023

(65) Prior Publication Data

US 2023/0359577 A1 Nov. 9, 2023

Related U.S. Application Data

(63) Continuation of application No. 17/184,456, filed on Feb. 24, 2021, now Pat. No. 11,709,790.

(51) Int. Cl.
*G06F 13/42* (2006.01)
*G06F 21/60* (2013.01)

(52) U.S. Cl.
CPC ........ *G06F 13/4208* (2013.01); *G06F 21/602* (2013.01)

(58) Field of Classification Search
CPC .......................... G06F 13/4208; G06F 21/602
See application file for complete search history.

(56) References Cited

U.S. PATENT DOCUMENTS

| | | | |
|---|---|---|---|
| 10,037,299 B1 * | 7/2018 | Ramey | G06F 13/4221 |
| 10,129,018 B2 * | 11/2018 | Satpathy | G06F 21/602 |
| 10,698,842 B1 | 6/2020 | Dastidar et al. | |
| 10,715,451 B2 * | 7/2020 | Raindel | G06F 21/602 |
| 11,709,790 B2 * | 7/2023 | Dastidar | G06F 15/1735 710/105 |
| 2009/0037624 A1 * | 2/2009 | Saripalli | G06F 12/0815 710/72 |
| 2016/0232019 A1 * | 8/2016 | Shah | G06F 9/45558 |
| 2019/0026146 A1 * | 1/2019 | Peffers | G06F 9/5044 |
| 2019/0044994 A1 * | 2/2019 | Sarangam | H04L 63/0485 |
| 2019/0124054 A1 * | 4/2019 | Zhang | H04L 63/166 |
| 2020/0328192 A1 | 10/2020 | Zaman et al. | |
| 2020/0341941 A1 | 10/2020 | Dastidar et al. | |

OTHER PUBLICATIONS

Lin, Jiaxin, et al., "PANIC: A High-Performance Programmab le NIC for Multi-tenant Networks" Usenix, Proceedings of the 14th USENIX Symposium on Operating Systems Design adn Implementation, Nov. 4-6, 2020 (18 pages).

* cited by examiner

*Primary Examiner* — Henry Tsai
*Assistant Examiner* — John B Roche
(74) *Attorney, Agent, or Firm* — Patterson + Sheridan, LLP

(57) ABSTRACT

The embodiments herein describe a 3D SmartNIC that spatially distributes compute, storage, or network functions in three dimensions using a plurality of layers. That is, unlike current SmartNIC that can perform acceleration functions in a 2D, a 3D Smart can distribute these functions across multiple stacked layers, where each layer can communicate directly or indirectly with the other layers.

20 Claims, 6 Drawing Sheets

SPATIAL DISTRIBUTION IN A 3D DATA PROCESSING UNIT

CROSS REFERENCE TO RELATED APPLICATION

This application is a continuation of U.S. Non-Provisional patent application Ser. No. 17/184,456, filed Feb. 24, 2021 of which is incorporated herein by reference in its entirety.

TECHNICAL FIELD

Examples of the present disclosure generally relate to a 3D network interface card (NIC) that includes multiple stacked layers in communication with each other.

BACKGROUND

There has been accelerated growth in cloud infrastructure to keep up with the ever increasing demand for services hosted in the cloud. To free up server CPUs to focus on running the customers' applications, there has been an increasing need to offload compute, network, and storage functions to accelerators. These accelerators are part of the cloud's hyper-converged infrastructure (HCI) giving the cloud vendor a simpler way to manage a single customer's or multiple customers' varying compute-centric, network-centric, and storage-centric workloads. Many cloud operators use SmartNICs to help process these workloads. Generally, SmartNICs are NICs that include data processing units that can perform network traffic processing, and accelerate and offload other functions, that would otherwise be performed by the Host CPU if a standard or "simple" NIC were used. SmartNICs are adept at converging multiple offload acceleration functions in one component, adaptable enough to accelerate new functions or support new protocols, and also offer the cloud vendor a way to manage virtualization and security for the case of multiple cloud tenants (e.g., customers) concurrently using the HCI. The term Data Processing Unit (DPU) is also used in lieu of SmartNIC, to describe the collection of processing, acceleration and offload functions for virtualization, security, networking, compute and storage or subsets thereof. A 3D DPU can have various types of form factors such as peripheral cards, OCP accelerator modules, or directly mounted on a motherboard with other components/accelerators/memory.

SmartNICs are adaptable to rapidly changing workloads through offload acceleration of new functions and protocols created over their lifecycle. SmartNICs (e.g., PCIe cards) are typically plugged into a server or storage node in the cloud, connecting to the top-of-rack (TOR) Network Switch and then the rest of the cloud. Hyperscale deployments of these components in the millions of units also make power consumption a key metric of SmartNICs. The combination of adaptable intelligence with low power consumption make the combination of programmable logic and hardened acceleration particularly well suited as SmartNIC devices.

Even though the hyper-converged nature of SmartNICs means they can perform compute, networking and storage functions in one component, current SmartNICs spatially disaggregate these functions in two dimensions, either disaggregating these functions over multiple chiplets in a package, or disaggregating over a large monolithic die. Put differently, the data processing units that perform the workloads that otherwise would have to be performed by the CPUs in the servers are arranged on a 2D plane, either chiplets mounted on the same substrate (e.g., printed circuit board), or different processing units formed in the same chip. This severely limits the scalability of these SmartNICs to meet future bandwidth demands.

In addition, the nature of SmartNIC processing requires movement of not only the network flows but a significant amount of metadata associated with those flows. The metadata may contain a set of action verbs or commands for the current stage of the processing or acceleration pipeline in the SmartNIC, and may also contain action verbs or serve as a reference for the next stage of the acceleration pipeline to interpret/execute. In a multi-tenant environment, where either the same service is provided by the SmartNIC to multiple tenants in the host, or multiple network, compute, or storage functions are provided to the same tenant, the metadata may also carry information about the tenant's identity, their service level agreement (SLA) and/or the type of service or acceleration functions the tenant desires. As the number of offload accelerator functions increase, the amount of metadata or types of metadata also increases. As a result of these attributes, the metadata is often a significant overhead relative to the amount of data being processed or moved. Furthermore, SmartNIC processing also requires temporary buffering of the data, and in some cases, some or all of the metadata, as the particular tenant's traffic is being processed, or when determining the next function or processing step for the data. That is, due to the spatially distributed nature of current techniques, there is repetitive buffering of the data and metadata, as the tenant's traffic migrates through various stages of the pipeline. As the amount of link bandwidth increases, the amount of repetitive buffering also increases thus resulting in an inefficient usage of resources for spatially distributing the data movement.

SUMMARY

One embodiment described herein is a NIC that includes multiple layers arranged in a stack and communicatively coupled to each other, a plurality of accelerator functions in the multiple layers, and a sequencer disposed in one of the multiple layers where the sequencer is configured to coordinate a traffic flow received at the NIC between different accelerator functions of the plurality of accelerator functions to form a pipeline.

Another embodiment described herein is a 3D data processing unit that includes multiple layers arranged in a stack and communicatively coupled to each other, a plurality of accelerator functions in the multiple layers, and a sequencer disposed in one of the multiple layers, where the sequencer is configured to coordinate a traffic flow received at the 3D data processing unit between different accelerator functions of the plurality of accelerator functions to form a pipeline.

Another embodiment described herein is a system that includes a plurality of NICs each including multiple layers arranged in a stack and communicatively coupled to each other and a plurality of accelerator functions in the multiple layers. The system also includes a plurality of accelerator cards and a switch communicatively coupling the plurality of NICs to the plurality of accelerator cards where the plurality of NICs, the plurality of accelerator cards, and switch are disposed in a same box.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
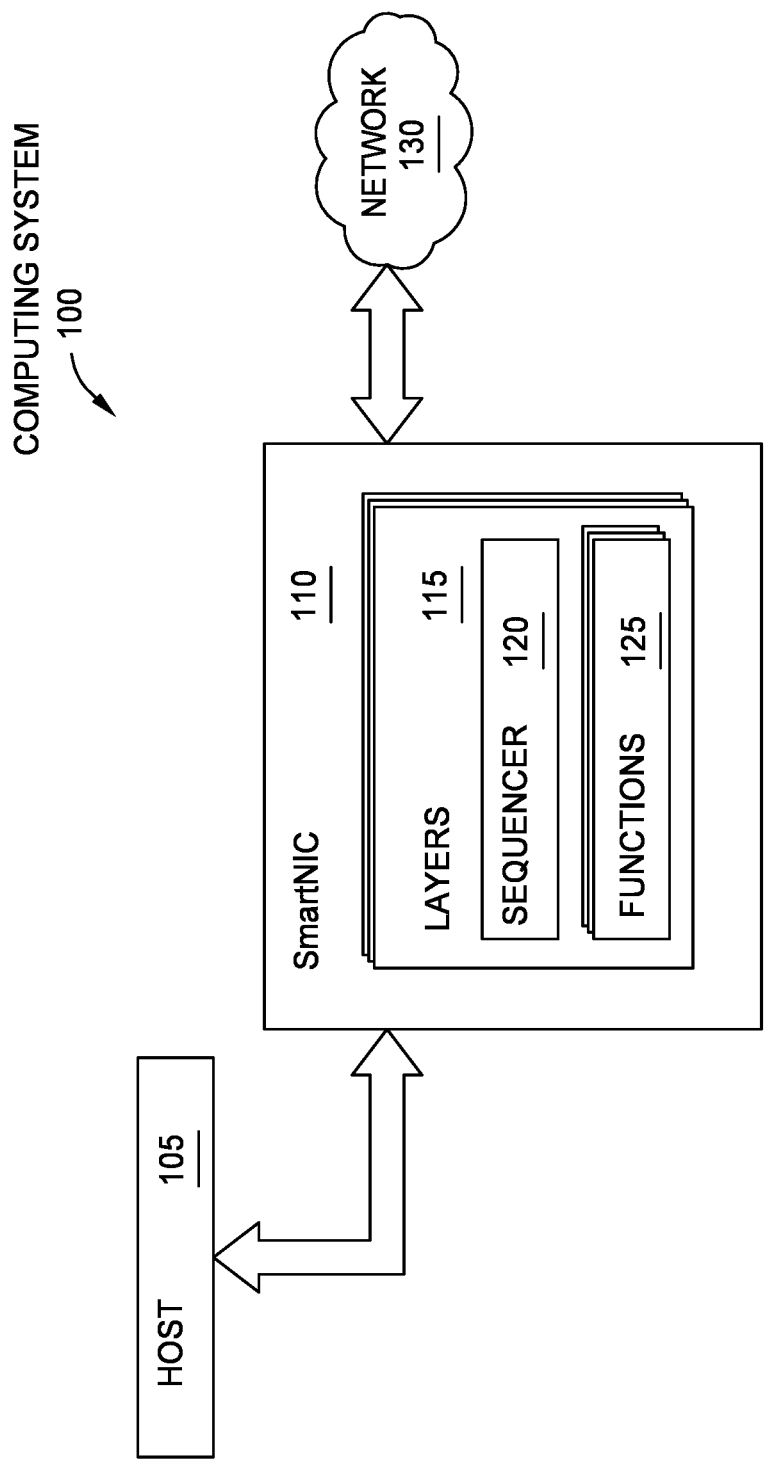
FIG. 1 illustrates a computing system with a 3D SmartNIC, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe a 3D SmartNIC that spatially distributes compute, storage, or network accelerator functions in three dimensions using a plurality of layers. That is, unlike current SmartNIC that can perform acceleration functions in a 2D plane (e.g., using chiplets disposed on a common substrate or data processing units integrated into the same monolithic chip), a 3D SmartNIC can distribute these functions across multiple stacked layers, where each layer can communicate directly or indirectly with the other layers. For example, the host may transmit a network flow including data (e.g., packets) that are executed in a pipeline formed from multiple accelerator functions in the 3D SmartNIC. For example, the network flow may first be processed by Function A in a first layer, then processed by Function B and Function C in a second layer, and then processed by Function D in a third layer. Because the latency between these pipelined functions can affect the overall throughput of the 3D SmartNIC, using multiple layers can improve the physical and logical coupling between the different stages (i.e., accelerator functions) in the pipeline relative to a SmartNIC where all the accelerator functions are performed by hardware on the same plane. That is, the physical and logical proximity of the Functions A-D may be smaller in a 3D SmartNIC than a 2D SmartNIC due to the use of multiple layers. Further, the 3D NIC can reduce the latency, as well as the number of repetitions, associated with data movement between these functions relative to a 2D SmartNIC.

Due to the tightly coupled and Active-on-Active (AoA) layers of a 3D SmartNIC, processing and movement of the data and metadata traverse a smaller physical distance and traverse pathways with orders of magnitude more bandwidth than available with prior techniques. Moreover, in one embodiment, the temporary buffering of the data is done in a universal/centralized manner in a packet buffer thus reducing the amount of repetitive buffering and resulting in efficient usage of resources for spatially distributed data movement for tenant traffic moving through the various stages of network, storage, or compute pipelined acceleration. In another embodiment, the packet buffers are spatially distributed, with distribution in either the 2D plane or in 3D, based on the sequence of accelerator usage, physical location of network, storage, or compute pipelined acceleration, and optimal latency between the packet buffer and the source and destination accelerators or external interfaces. The routing decision for which of the spatially distributed buffers is used can either be determined apriori and codified in the metadata or determined dynamically by a processing step in the acceleration pipeline.

In addition, some SmartNIC security requirements mandate that exposed link interfaces carrying tenant data be encrypted and also protected from side channel attacks, the exposed link being the attack surface, revealing confidential information. The advantage of 3D SmartNICs over prior techniques includes spatially distributing over exposed links to another chip or chiplet only encrypted tenant information. Any distribution of decrypted tenant information can be performed only on the z-axis (i.e., between layers), since the connections on the z-axis are not exposed. Another advantage of a 3D SmartNIC is that cryptography can be performed in a middle layer on the z-axis which prevents a nefarious actor from obtaining confidential information using non-invasive probing methods such as a laser probe of exposed interfaces.

FIG. 1 illustrates a computing system 100 with a 3D SmartNIC 110, according to an example. As shown, the computing system 100 includes a host 105 that relies on the SmartNIC 110 to exchange data with a network 130. For example, the network 130 may be a local network in a data center that connects the host 105 (e.g., a server) to other computing systems in the data center (e.g., other servers or network storage devices). While the 3D SmartNIC 110 is shown external to the host 105, in one embodiment the SmartNIC is disposed within the host 105. For example, the SmartNIC 110 may be a PCIe card that is plugged into a PCIe slot in the host 105.

The 3D SmartNIC 110 includes multiple layers 115 (or decks) that form a 3D structure. That is, rather than conventional SmartNICs that have compute resources disposed on a 2D plane such as multiple chiplets disposed on a common substrate (e.g., a PCB board) or a single monolithic chip, the compute resources in the SmartNIC 110 are distributed across multiple layers 115. In one embodiment, the layers 115 are separate integrated circuits (ICs) or chips that form a stack. For example, the ICs may be bonded to each other using solder connections so that the compute resources in the different layers 115 can communicate. In another embodiment, the layers 115 can include separate substrates such as PCBs that include ICs or chiplets that are then connected, e.g., using solder bumps or wire bonds, to ICs or chiplets on substrates in other layers. Or the layers 115 can either be directly coupled to each other using through silicon via connections for a third dimension of connectivity by stacking layers, or go through a different type of substrate (e.g. PCBs), and use solder bump or wire bond connections to achieve a third dimension of connectivity between layers 115.

The layers 115 include at least one sequencer 120. In one embodiment, there is only one sequencer in the SmartNIC 110 (i.e., only one of the layers 115 has the sequencer 120), while in other embodiments it may be advantageous to have multiple sequencers 120 in the same layer 115 or on different layers 115. Generally, the sequencer 120 coordinates traffic flows between different accelerator functions 125 in the SmartNIC 110. The sequencer may also coordinate usage of the universal/centralized packet buffer, or coordinate the sequence of usage of spatially distributed packet buffers. In one embodiment, each layer 115 includes at least one function 125 that processes data in traffic flows received from either the host 105 or the network 130. Further, each layer 115 may include multiple functions 125.

In one embodiment, each accelerator function 125 is a hardware element that performs a compute, networking, or storage function on the data (or metadata) in the network flows. These hardware elements may be separate ICs in the layers 115, or one IC may have hardware elements for performing multiple accelerator functions 125. The accelerator functions 125 can include hardware elements for accelerating interfaces to the host 105 and network 130, cryptographic (crypto) accelerators, compression accelerators, fabric accelerators, memory controllers, memory elements (e.g., random access memory (RAM)), and the like. These hardware elements can be implemented using programmable logic blocks or hardened logic blocks. For example, memory controllers, RAM, interface (input/output (I/O)) accelerators, compression accelerators, and crypto accelerators may be implemented using hardened logic while the fabric accelerators are implemented using programmable logic (e.g., configurable logic blocks). In other embodiments, however, some accelerators (e.g., crypto or compression accelerators) may be implemented in programmable logic instead of hardened logic.

Figure 2:
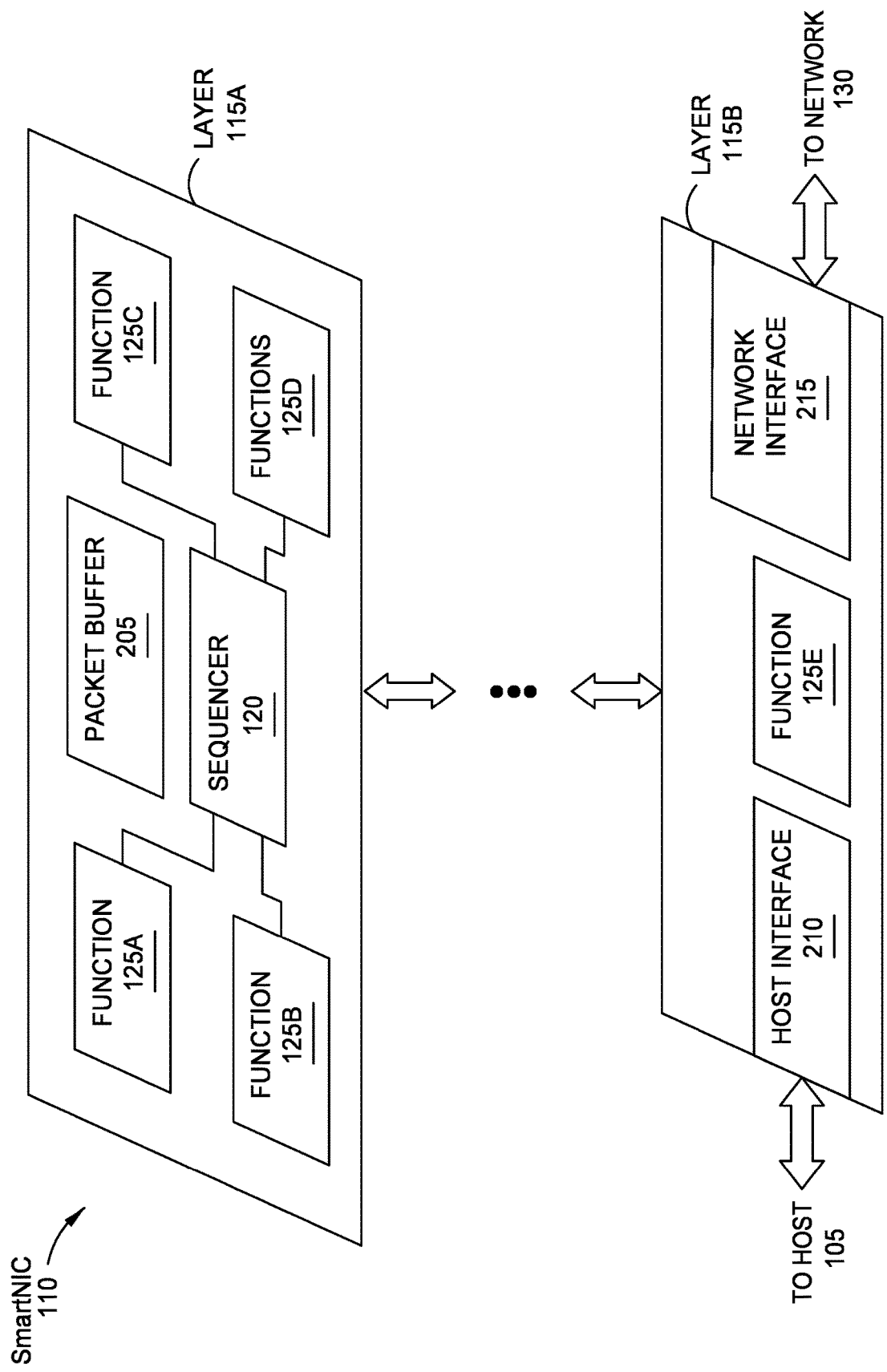
FIG. 2 illustrates multiple layers in a 3D SmartNIC, according to an example.

FIG. 2 illustrates multiple layers in the 3D SmartNIC 110, according to an example. In FIG. 2, the 3D SmartNIC 110 can have any number of layers 115, although for simplicity, only two layers are illustrated: layers 115A and 115B. For example, the layers 115A and 115B may be the only two layers in the SmartNIC 110, or there may be one or more layers between these two layers.

As shown, both of the layers 115 contain hardware elements forming the accelerator functions 125A-E. In this example, the layer 115A includes the accelerator functions 125A-D while the layer 115B includes the accelerator function 125E. Moreover, the layer 115A includes the sequencer 120 which is communicatively coupled to each of the accelerator functions 125A-D in the layer 115A. Although not shown, the sequencer 120 is also coupled to the accelerator function 125E in the layer 115B, and may be coupled to a host interface 210 and a network interface 215.

As mentioned above, the sequencer 120 coordinates how network traffic flows between the accelerator functions 125 in order to form different stages in a data acceleration pipeline. In one embodiment, the sequencer 120 establishes a pipeline for each network flow, where the accelerator functions 125 form stages of the pipeline. For example, for a first network flow (which may be associated with a first customer or tenant), the data may first be sent to the function 125A, then to the function 125D, and finally to the function 125E. However, for a second network flow of a different customer or tenant, its data may first be sent to the function 125E and then to the function 125B. The details for establishing different pipelines for different network flows using the sequencer 120 are described below in relation to FIG. 5.

The layer 115A also includes a packet buffer 205 which serves as a centralized and universal packet holding area for data being transferred between the functions 125 and the host and network interfaces 210 and 215. Continuing the example above, after a packet of the first network flow is processed by the function 125A, the next function in the pipeline—i.e., the function 125D—may not be ready for the packet. The function 125A can store the packet in the packet buffer 205 until the function 125D is ready for the packet. Thus, although not shown, each function 125A-D may be connected to the packet buffer 205. The packet buffer 205 may also be used when transferring packets between the layers 115. For example, the SmartNIC 110 may use the packet buffer 205 to temporary store packets before these packets are stored in RAM as part of the function 125E. The packet buffer 205 is a universal buffer because it can be used by the various functions 125 in the SmartNIC 110 which may perform different network, computer, and storage acceleration tasks. Thus, in one embodiment, each accelerator function (as well as the host and network interfaces 210, 215) are connected to the packet buffer 205 so they can store packets in, and retrieve packets from, the buffer 205.

The arrangement of the accelerator functions 125, sequencer 120, packet buffer 205, and host and network interfaces 210, 215 in FIG. 2 is just one example of a 3D SmartNIC. For example, in other embodiments, the host and network interfaces 210, 215 may be disposed on the layer 115A. Further, the layer 115B may have more than one accelerator function (i.e., the function 125E), or the layer 115A may include more or less accelerator functions than the ones shown.

Figure 3:
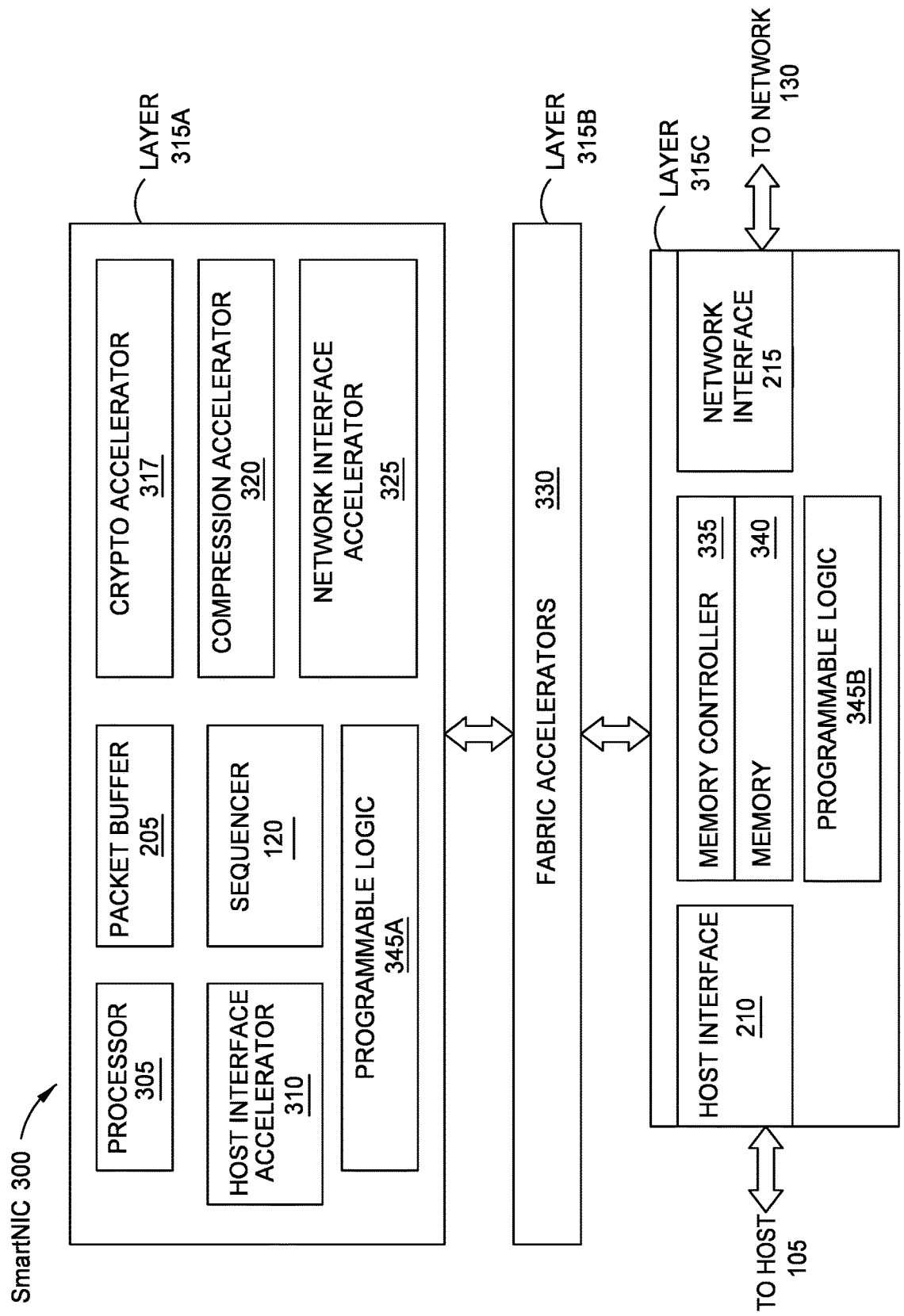
FIG. 3 illustrates a 3D SmartNIC with a fabric layer, according to an example.

FIG. 3 illustrates a 3D SmartNIC 300 with a fabric layer, according to an example. As shown, the SmartNIC 300 includes three layers 315A-C with various accelerator functions being distributed throughout the layers 315. In this example, the layer 315A includes the sequencer 120 and packet buffer 205 as discussed above, along with a processor 305, host interface accelerator 310, crypto accelerator 317, compression accelerator 320, and network interface accelerator 325. The processor 305, host interface accelerator 310, crypto accelerator 317, compression accelerator 320, and network interface accelerator 325 are examples of the accelerator functions 125 discussed in FIGS. 1 and 2.

The processor 305 may be an ARM or x86 processor that can perform compute tasks for the data in the network flow. The host interface accelerator 310 and the network interface accelerator 325 accelerate the functions performed by the host interface 210 and the network interface 215, respectively. The crypto accelerator 317 can decrypt and encrypt data as it enters and leaves the SmartNIC 300. For example, some functions may require decrypted data, in which case, the sequencer 120 may first route the data (which was received by the SmartNIC in an encrypted state) to the crypto accelerator 317 to be decrypted, processed by the function, and then encrypted again before the data is transmitted out of the SmartNIC 300.

The compression accelerator 320 can perform data compression and decompression. For example, the host may transmit data to be stored in network storage. Rather than the host 105 compressing the network flow, the host 105 can instruct the compression accelerator 320 in the SmartNIC 300 to compress data in the network flow before forwarding the compressed data to the network storage device using the network 130. When the SmartNIC 300 receives compressed data from the network storage device, the compression accelerator 320 can decompress the data before forwarding it to the host 105. Moreover, the SmartNIC 300 may compress data that is stored internally using the compression accelerator 320.

In one embodiment, the 3D SmartNIC 300 may include multiple crypto and compression accelerators. For example, the layer 315A may include both an AES-XTS crypto accelerator and an AES-GCM crypto accelerator. The SmartNIC 300 may also include different crypto accelerators that execute different compression algorithms.

The layer 315B includes fabric accelerators 330 that, in one embodiment, are implemented using programmable logic. The fabric accelerators 330 can provide connectivity between the functions in the layer 315A and the functions in the layer 315C. For example, the fabric accelerators 330 may include a first fabric accelerator for storing data in memory 340 in the layer 315C (e.g., RAM). The accelerators 330 may also include a second fabric accelerator used by the sequencer 120 to communicate with functions in the other layers, and a third fabric accelerator used by the crypto accelerator 317 or compression accelerator 320 when communicating data between the layers. The layers 315A and 315C may also include programmable logic 345 creating the ability to customize accelerator functions or customize the communication or sequencing between accelerator functions. In one embodiment, the programmable logic 345A in layer 315A is between the host interface accelerator 310 and the processor 305 and customizes certain host interface data to provide processing hints to the processor 305 to increase the cache efficiency of processor 305. In another embodiment, the programmable logic 345A between the crypto accelerator 317 and the network interface accelerator 325 and customizes the cryptographic keys used or cryptographic algorithm used for traffic received by, or heading to, the network interface accelerator 325. In these examples, the programmable logic 345A functions as a shim to provide customized processing or communication between at least two accelerator functions in the layer 315A. Moreover, the layer 315C also can include programmable logic 345B that functions as a shim for permitting communication between its hardened components.

In one embodiment, the layer 315B also includes a packet buffer block, like the packet buffer 205 in the layer 315A, or a network key management block. Further, hardened accelerator blocks like those in the layer 315A (e.g., the accelerators 310, 317, 320, or 325) can also be included in the layer 315B.

In one embodiment, layer 315A also includes a fabric accelerator (e.g., one or more fabric accelerator blocks) that provides connectivity between the functions in the layer 315A. That is, each layer may have its own fabric accelerator to provide communication between functions in that layer while the fabric accelerator 330 in the layer 315B provides connections between the layers 315A-C.

The layer 315C includes the host interface 210, the network interface 215, a memory controller 335, and the memory 340. The memory 340 may be used to store data longer than the packet buffer 205. For example, data may be stored in the packet buffer 205 when the data transitions between different accelerator functions (e.g., different stages in the pipeline), but when the data has to wait for longer period of time, the SmartNIC 300 may store the data in the memory 340. The memory 340 may also be used to store accelerator related metadata, for example cryptographic keys or cryptographic state of the crypto accelerator 317.

As shown, the layers 315 can communicate with each other. In one embodiment, the layers 315A and 315C communicate using the layer 315B which serves as a fabric layer (i.e., an interconnect). In this example, the layer 315B serves as an indirect connection between the layers 315A and 315C. However, in another embodiment, the layers 315A and 315C can communicate directly with each other without passing through logic in the layer 315B. For example, the layer 315B may include through vias (e.g., through silicon vias) that directly connect a bump pad in the layer 315C to a bump pad in the layer 315A. In that way, the functions in layer 315A can directly communicate with functions in the layer 315C without relying on the fabric accelerators 330 in the layer 315B. For example, some functions in the layer 315A may use these through vias to directly communicate with the layer 315C while other functions in the layer 315A may use the fabric accelerators 330 when communicating with the layer 315C. If the SmartNIC 300 is expanded to include multiple intermediate layers, the layers can also have through vias connected together to provide direct connections between the top layer 315A and the bottom layer 315C, if desired.

Spatially distributing the functions on multiple layers as shown in FIGS. 1-3 can provide tighter coupling between these functions (and between the packet buffer 205 and sequencer 120) than if all these hardware elements were disposed on the same 2D plane. For example, if these functions were all disposed on the same monolithic chip, it may require more latency to transfer data between two functions on opposite ends of the chip than it would to transfer the data between two functions on different layers. Thus, using a 3D structure for the SmartNIC 300 can enable more functions to be implemented in the SmartNIC 300 which makes the SmartNIC 300 more flexible and scalable without increasing the latency involved with spatially distributing the functions.

Figure 4:
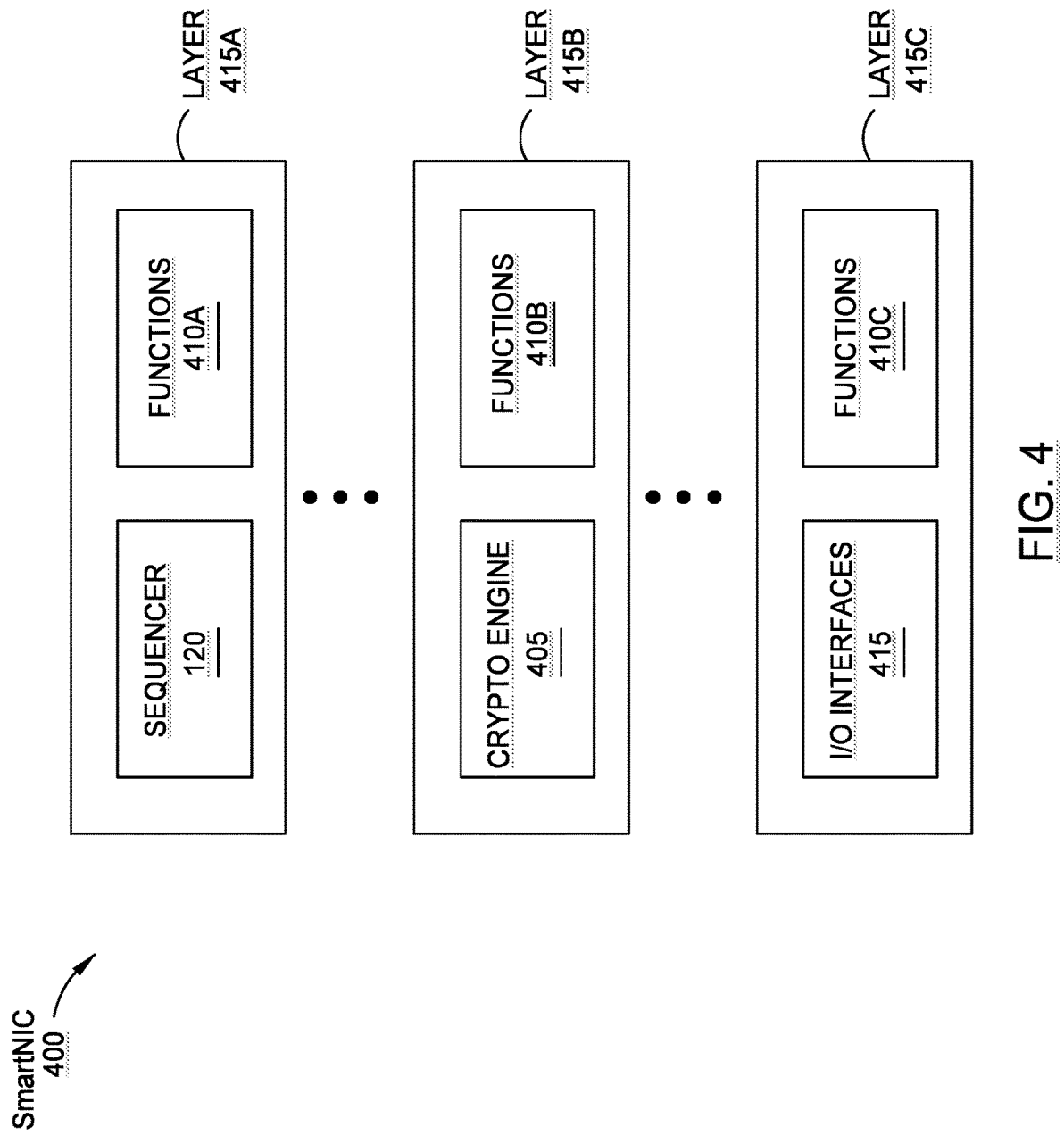
FIG. 4 illustrates a 3D SmartNIC with a crypto engine in a middle layer, according to an example.

FIG. 4 illustrates a 3D SmartNIC 400 with a crypto engine 405 in a middle layer 415B, according to an example. That is, the SmartNIC 400 includes three layers 415A-C where the crypto engine 405 is disposed in the middle layer 415B sandwiched between the upper layer 415A and the lower layer 415C. Doing so provides an additional physical protection to the crypto engine 405. For example, this protects the crypto engine 405 from physical intrusion attempts to access its keys. A nefarious actor would have to disassemble the SmartNIC 400 in a manner such that SmartNIC 400 continues to be operational, in order to access the keys used by the crypto engine 405. However, a 2D SmartNIC does not offer the same protection since its crypto engine 405 would need to be located on the 2D plane which is easier to access.

In one embodiment, the crypto engine 405 may be disposed on its own layer 415 in the SmartNIC 400. However, in another embodiment, additional functions (e.g., 410A-410C) may be disposed in the same layer 415B as the engine 405. For example, the layer 415B may also include the fabric accelerators 330 illustrated in FIG. 3.

Figure 5:
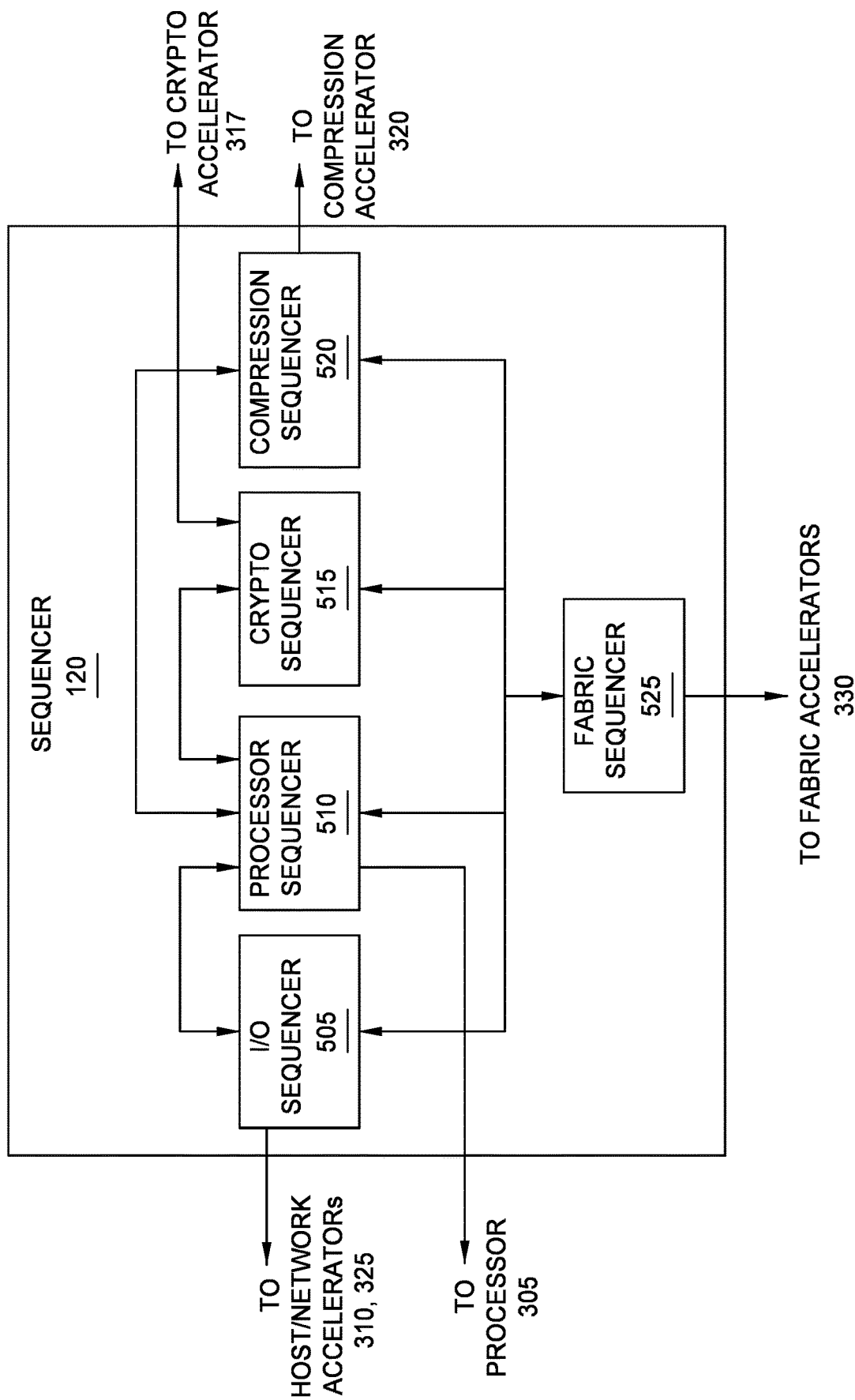
FIG. 5 illustrates a sequencer, according to an example.

FIG. 5 illustrates the sequencer 120, which in this example, can be used with the various accelerator functions illustrated in FIG. 3—e.g., the processor 305, the host interface accelerator 310, the crypto accelerator 317, the compression accelerator 320, and the network interface accelerator 325. In this embodiment, the sequencer 120 has sub-sequencer modules for communicating with these functions. That is, the sequencer 120 includes an I/O sequencer 505 corresponding to the host and network interface accelerators 310, 325, a processor sequencer 510 corresponding to the processor 305, a crypto sequencer 515 corresponding to the crypto accelerator 317, the compression sequencer 520 corresponding to the compression accelerator 320, and the fabric sequencer 525.

The communication between spatially distributed accelerator functions (e.g., the processor 305, the host interface accelerator 310, the crypto accelerator 317, the compression accelerator 320, and the network interface accelerator 325) and the sequencer 120 can be performed in at least two ways. First, the metadata interpreted by either the sequencer 120 or the functions contains a turn list describing which of the distributed functions the particular traffic flow needs to traverse in sequence as the tenant data has pipelined acceleration performed. Put differently, the metadata corresponding to a traffic flow can define the order in which the data should be processed by the functions. This turn list establishes the stages of the pipeline which determines which functions are used to process the packets in the network flow and the order in which the selected functions process the packets.

Second, the metadata includes a linked list of pipelined acceleration functions that should be used to process the packets, where a null pointer in the linked list indicates an egress point (e.g. Host or Network egress), or the null pointer indicates the pipeline stage which is the next-to-last destination in the linked list, prior to the null pointer, that is expected to populate the next linked list function (or functions) based on its processing of that packet. In this manner, the next stages or functions of the pipeline can be selected dynamically, as the packets are being processed.

Both of these techniques achieve low latency of traffic flows as they traverse their different functions and achieves low residency of the traffic flow in the packet buffer 205, thereby increasing the efficiency of the packet buffer 205 for network flows of other tenants.

Figure 6:
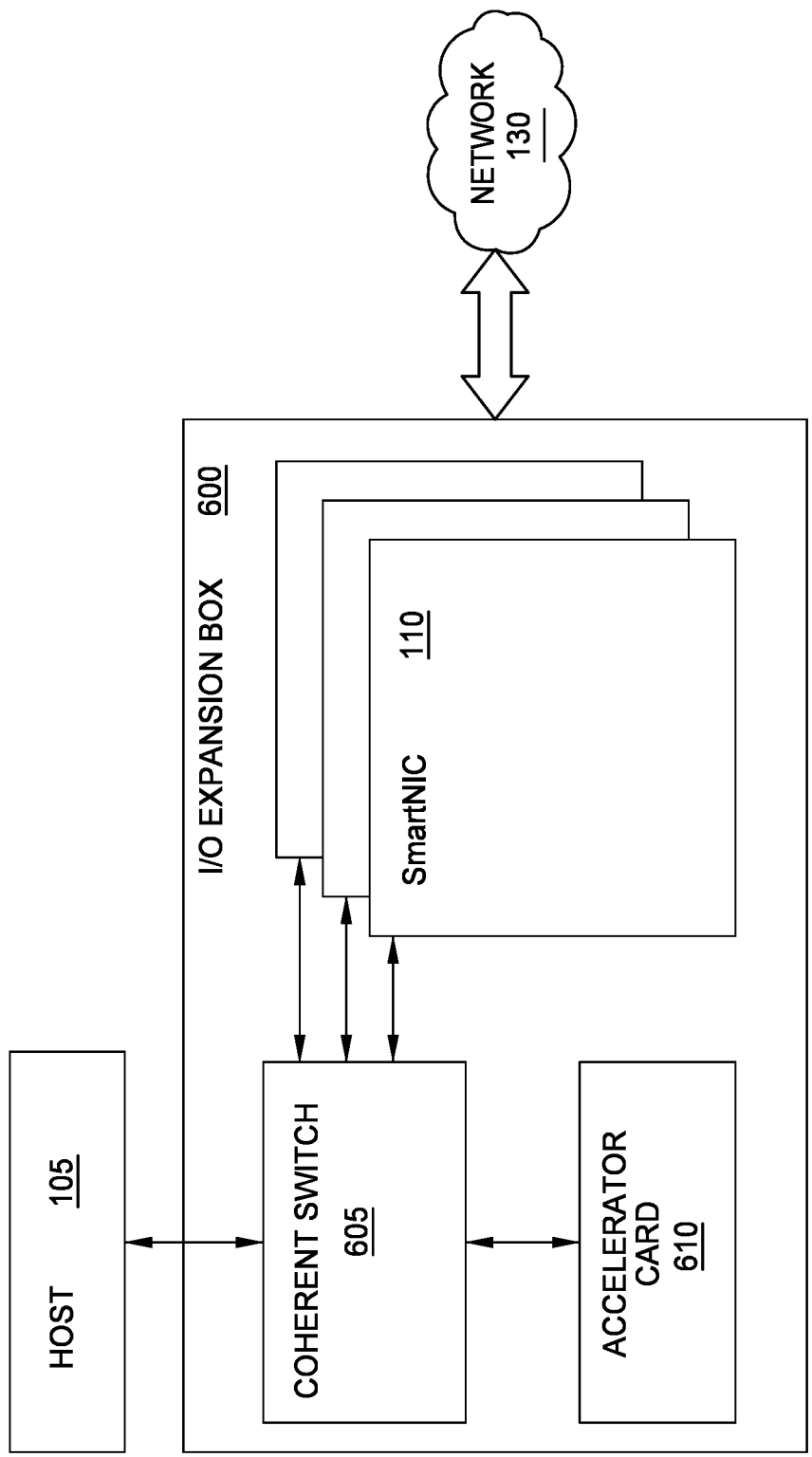
FIG. 6 is a block diagram of an I/O expansion box containing SmartNICs, according to an example.

FIG. 6 is a block diagram of an I/O expansion box 600 containing SmartNICs 110 and storage, machine learning, or other accelerator cards 610, according to an example. In FIG. 6, the host 105 communicates with a plurality of SmartNICs 110 which may be separate substrates or the same substrate. The SmartNICs 110, in turn, are communicatively coupled to the storage, machine learning, or other accelerator cards 610. The expansion box 600 includes a switch 605 to permit communication between the host 105 and the SmartNICs 110, and between the SmartNICs and storage, machine learning, or other accelerator cards. In one embodiment, the switch facilitates cache coherent and non-cache coherent communication between the host 105, the SmartNICs 110, and the storage, machine learning, or other accelerator cards 610. Thus, the switch 605 can support transferring data between the host 105, the SmartNICs 110, and the storage, machine learning, or other accelerator cards 610 in a cache coherent manner where the memory space of the host 105 is shared by the SmartNICs 110 and the storage, machine learning, or other accelerator cards 610, or by using a non-coherent data transfer (e.g., direct memory access (DMA) read or write).

As an example, the host 105 transfer data that is to be sent to all the SmartNICs 110 using the coherent domain (assuming the data is not too large), but use the non-coherent domain to transfer large amounts of data, or data that is destined only for one of the SmartNICs 110.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network interface card (NIC), comprising:
multiple layers arranged in a stack and communicatively coupled to each other; and
a plurality of accelerator functions in the multiple layers, wherein the NIC is configured to coordinate a traffic flow between different accelerator functions in different layers of the multiple layers of the plurality of accelerator functions to form a pipeline.

2. The NIC of claim 1, wherein each of the multiple layers comprises at least one integrated circuit.

3. The NIC of claim 2, wherein the integrated circuits are bonded directly to each other.

4. The NIC of claim 1, further comprising:
a packet buffer connected to the plurality of accelerator functions, wherein the different accelerator functions are configured to use the packet buffer to temporarily store packets in between stages of the pipeline, wherein the different accelerator functions form the stages in the pipeline.

5. The NIC of claim 1, wherein the multiple layers comprise at least an upper layer, a middle layer, and a bottom layer, wherein the middle layer comprises at least one fabric accelerator implemented using programmable logic.

6. The NIC of claim 1, wherein the multiple layers comprise at least an upper layer, a middle layer, and a bottom layer, wherein the middle layer comprises a cryptographic engine for encrypting or decrypting data in the traffic flow.

7. The NIC of claim 1, wherein the multiple layers comprise a first layer that includes at least two accelerator functions, wherein the first layer further comprises programmable logic for providing customized processing or communication between the at least two accelerator functions.

8. The NIC of claim 7, wherein the at least two accelerator functions are formed using hardened logic.

9. A 3D network interface card (NIC), comprising:
a first integrated circuit (IC); and
a second IC stacked on the first IC,
wherein the second IC comprises one or more accelerator functions, and
wherein the first IC comprises a fabric accelerator comprising programmable logic, and wherein the fabric accelerator is coupled to the one or more accelerator functions in the second IC.

10. The 3D NIC of claim 9, further comprising:
a third IC stacked with the first and second ICs.

11. The 3D NIC of claim 10, wherein the first IC is disposed between the second IC and the third IC, wherein the fabric accelerator provides connectivity between the one or more accelerator functions in the second IC and a hardware element in the third IC.

12. The 3D NIC of claim 11, wherein the hardware element in the third IC comprises at least one of a memory controller, a host interface, or a network interface.

13. The 3D NIC of claim 9, wherein the one or more accelerator functions in the first IC are hardened.

14. The 3D NIC of claim 13, wherein the second IC comprises programmable logic used to implement a different accelerator function in the second IC.

15. The 3D NIC of claim 9, wherein the first IC comprises a plurality of fabric accelerators comprising programmable logic.

16. The 3D NIC of claim 9, wherein the first and second ICs are bonded directly to each other.

17. The 3D NIC of claim 9, wherein the fabric accelerator is connected to at least two accelerator functions and is programmed to provide customized processing or communication between the at least two accelerator functions.

18. A 3D network interface card (NIC), comprising:
a first IC comprising a fabric accelerator formed using programmable logic; and a second IC stacked on the first IC, the second IC comprising one or more accelerator functions comprising hardened logic, wherein the fabric accelerator in the first IC is coupled to the one or more accelerator functions in the second IC.

19. The 3D NIC of claim 18, further comprising:

a third IC stacked with the first and second ICs.

20. The 3D NIC of claim 19, wherein the first IC is disposed between the second IC and the third IC, wherein the fabric accelerator provides connectivity between the one or more accelerator functions in the second IC and a hardware function in the third IC.

\* \* \* \* \*